Patented Oct. 10, 1950

2,525,150

UNITED STATES PATENT OFFICE 2,525,150

METHOD OF PREPARING SUBSTITUTED PTERIDINES

James M. Smith, Jr., North Plainfield, N. J., assignor to American Cyanamid Company, New York, N. Y., corporation of Maine No Drawing. Application June 10, 1949, Serial No. 98,393

10 Claims. (Cl. 260—251.5)

The present invention relates to a method of preparing substituted pteridines. More particularly, it relates to the preparation of 2-amino-4-hydroxy substituted pteridines. This application is a continuation-in-part of my application, Serial Number 15,723, filed March 18, 1948, now abandoned.

Recently pteroic acid and some of its amino acid amides have been synthesized and found to possess biological activity. The glutamic acid amides of pteroic acid such as N-[4-{[(2-amino-4-hydroxy - 6 - pyrimido[4,5-b]pyrazyl) methyl]-amino}benzoyl]glutamic acid have been found effective in stimulating the formation of hemoglobin and useful in the treatment of macrocytic anemia, sprue and other diseases. This compound is also commercially known as folic acid. The process of preparing this and related compounds is described in a co-pending application of Coy W. Waller and John H. Mowat, Serial Number 606,704, filed July 23, 1945, now Patent No. 2,500,296.

I have discovered that these compounds and other substituted pteridines, having an amino group in the 2-position and a hydroxy group in the 4-position, can be prepared from the corresponding 4-amino or 4-substituted amino pteridines, which do not exhibit the above desirable therapeutic properties, by hydrolysis with aqueous alkali at an elevated temperature.

The process of preparing the 2-amino-4-hydroxy pteridines of the present invention may be illustrated by the following equation:

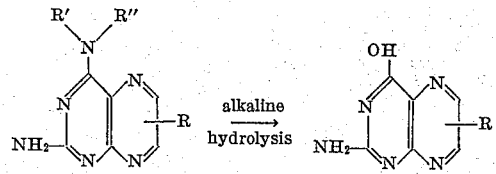

in whihc R is an alkyl or amino-substituted alkyl radical and R' and R" are members of the group consisting of hydrogen, alkyl, aralkyl and aryl radicals, and radicals forming a portion of a saturated heterocyclic ring.

The preparation of the 2,4-diaminopteridines, in which R of the general formula is a methyl group substituted with a secondary amino group, is described in the co-pending application of Doris R. Seeger, Serial Number 781,495, filed October 22, 1947. The compounds useful as intermediates in this application correspond to those illustrated by the general equation in which R is the substituted alkyl radical —CH₂NRH' in which R' is an aromatic radical. Among the compounds disclosed and claimed in application Serial Number 781,495, are the following: N-[4-{[(2,4-diaminopyrimido[4,5-b]-pyrazyl- 6) methyl]-amino}benzoyl]glutamic acid; N-[4-{[(2,4-diaminopyrimido[4,5-b]pyrazyl-6) methyl]amino}-benzoyl]aspartic acid; and other substituted pteridines in which the glutamic and aspartic acid radicals of the above compounds are replaced with other amino acids and peptides thereof. The preparation of representative compounds of this group is also described in the examples of the present application.

Other 4-amino or 4-substituted amino pteridines, useful as intermediates in the present invention in which R of the general equation is a substituted methyl group having the formula —CH₂NR'R" in which R' is alkyl or substituted alkyl and R" is an aromatic radical, are described in an application of which I am co-inventor, Serial Number 761,492, filed October 22, 1947, now Patent No. 2,444,286. The compounds described therein are of the type 4-{N-[(2,4-diaminopyrimido[4,5-b]pyrazyl-6) methyl]- N - alkylamino}benzoic acid and the amino acid amides thereof. Still other pteridines having in the 4-position an alkyl amino, dialkylamino, para-benzoylglutamylamino, piperidyl, piperazyl, morpholinyl, and the like radicals can be used in the present invention. These compounds are described and claimed in a co-pending application, Serial Number 98,638, filed June 11, 1949. The preparation of representative members of this group is described hereinafter in the examples. Also, compounds useful as intermediates in the present invention are the 2,4-diamino-6 or 7-alkyl pteridines such as 2,4-diamino-6-methylpteridine and 2,4-diamino-7-methylpteridine.

In carrying out the process of the present invention the substituents in the 6 and 7 positions on the pteridine ring will determine the particular conditions which may be used to hydrolyze the 4-amino or 4-substituted amino pteridine to the corresponding 2-amino-4-hydroxypteridine. When using intermediates having the general formula:

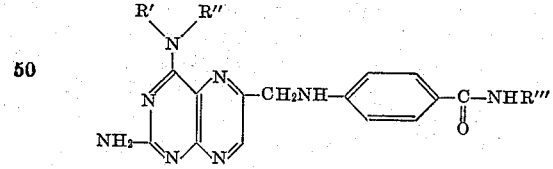

in which R' and R" are hydrogen or an alkyl radical and NHR''' is the radical of an amino acid, it is desirable that the hydrolysis be carried out under anaerobic alkaline conditions, since, if the reaction is carried out in the presence of air or other oxidizing agents or under acid conditions, the molecule is likely to be cleaved at the methylene group or at the peptide linkage. When compounds such as 2,4-diamino-6 or 7-alkyl pteridines are used as intermediates, the above method can be used as well as other methods. For instance, the reaction can be carried out in the presence of air under alkaline conditions and also in the presence of air under acid conditions, as shown hereinafter in the examples.

The alkaline agents which I can use in carrying out the hydrolysis are the alkali metal hydroxides such as sodium hydroxide and potassium hydroxide and the like, also barium hydroxide, benzyl trimethyl ammonium hyroxide, lime, ammonia, and the like.

The reaction is preferably carried out in water or a substantially aqueous solvent which may consist of water and water miscible solvents.

In carrying out the reaction the temperature range of from 80°–110° C. can be used, however, I prefer to use a range of from 90°–100° C.

The reaction is usually complete in from 2 to about 8 hours when carried out at the preferred temperature range.

The process and representative compounds of the invention will now be disclosed in detail in the following examples. It will be understood, of course, that other products using intermediates mentioned hereinbefore may be prepared by the same process. All parts are by weight unless otherwise indicated.

Example 1

2.7 parts of 2,4,5,6-tetraaminopyrimidine sulfate and 2.4 parts of barium chloride .2H$_2$O are slurried with 60 parts of water at 60° C. for 10 minutes. After cooling to 45° C., 1.33 parts of p-aminobenzoylglutamic acid are added, and the pH is adjusted to 3, with caustic. The following solutions are then added simultaneously during 10 minutes: 2.2 parts of dibromopropionaldehyde dissolved in acetic acid; 1.3 parts of iodine and 2.5 parts of potassium iodide in 8 parts of water; caustic to maintain the pH at 3. Agitation is continued at the same temperature and pH for an additional 30 minutes, after which the slurry is cooled, treated with 1 part of diatomaceous earth, filtered and washed with water and alcohol.

A sample of the crude product containing 2 parts of N[4-{[(2,4-diaminopyrimido[4,5-b]pyrazyl-6)methyl]amino}benzoyl]glutamic acid is slurried with 4 parts of lime and 2,000 parts of water at 60°–70° C. for 15 minutes, diatomaceous earth is added as a filter aid and the mixture is filtered. The filtrate is treated with diatomaceous earth and 20% zinc chloride solution to a pH of 10.6. The slurry is then clarified, and the filtrate heated to 80° C. Zinc chloride solution is added to pH 6.8, and the zinc salt is filtered with diatomaceous earth. The cake is slurried with 4 parts of lime and 1,000 parts of water at 90° C. and clarified. The filtrate is adjusted to pH 4 with dilute HCl, cooled and filtered with diatomaceous earth. This cake is slurried with 4 parts of magnesium carbonate and 700 parts of water at 85°–90° C., stirred with 1.5 parts of activated charcoal for 5 minutes and filtered. The filtrate is adjusted to pH 4, cooled and filtered. The product weighs 1.1 parts and assays 74.3%.

A solution of 0.5 part of the purified product obtained above in 20 parts of normal sodium hydroxide solution is swept well with nitrogen and then heated under nitrogen for 6 hours at 100° C. The solution is cooled, diluted to 100 parts with water and adjusted to pH 3. The product weighs 0.394 part and has a chemical assay of 70.1% as pteroylglutamic acid. Bioassay showed a yield of 65.5% pure product. Should a product of higher purity be desired it can be obtained by a process of purification described in the copending application of Brian L. Hutchings, Serial Number 715,637, filed December 14, 1946, now Patent No. 2,470,491.

Example 2

A slurry of 26 parts of 2,4,5,6-tetraaminopyrimidine sulfate dihydrate, 24 parts barium chloride dihydrate, and 15 parts of p-methylaminobenzoic acid in 700 parts of water is heated at 80° C. for five minutes, adjusted to pH 3, and treated with 59 parts of 1,1,3-tribromoacetone. The mixture is heated at 80° C. for one hour, the pH being kept at 3 by addition of 50% caustic solution. After cooling to 10° C. the crude 4-{N-[(2,4-diaminopyrimido[4,5 - b]pyrazyl - 6)methyl] - N-methylamino}benzoic acid is filtered, washed and dried.

A slurry of 30 parts of the crude material in 1 liter of water containing 6 g. of lime is heated 40 minutes at 60° C. and filtered at this temperature. The cake is washed with water and hydrochloric acid added to the filtrate to adjust to pH 3.02. After cooling in the icebox overnight the precipitate is filtered off and slurried in 750 parts of water containing sodium hydroxide to give pH 11.0–11.6 at 80° C. When the material is all in solution, the mixture is adjusted to pH 7 while cooling to 20° C. After filtering, the pH is adjusted to 4–5 with hydrochloric acid, and the precipitated material filtered off. The cake is slurried in 500 parts of water and treated with magnesium oxide to obtain pH 8.9–9.3 at 80° C. Then 0.5 part of activated carbon is added, and the heating at 80° C. continued for 15 minutes more. After filtering, the filtrate is adjusted to pH 4–5 with dilute hydrochloric acid and cooled several hours at 10° C. The yellow-orange crystalline material which is isolated by filtration weighs about one gram.

A solution of 25 parts of the purified product obtained above in 2,500 parts of 1 N sodium hydroxide is heated at 100° C. under an atmosphere of nitrogen for 6 hours. After diluting with water the solution is adjusted to pH 3–4 with 5 N hydrochloric acid. The precipitated material is collected in the centrifuge, washed, and dried. The product, 4-{N-[(2-amino-4-hydroxypyrimido[4,5-b]pyrazyl-6) - methyl] - N - methylamino}benzoic acid, is 85% pure when compared with a pure product made by a different method.

Example 3

To a solution of 27 parts of 2,4,5,6-tetraaminopyrimidine sulfate in 2,000 parts of N/4 HCl at 40° C. is added 25 parts of a 30% solution of methyl glyoxal. A deep golden yellow color appears at once. After about one half hour 130 parts of 50% sodium hydroxide solution is added, and the solution is cooled. The product is deposited as yellow crystals, which are filtered off, washed with water and dried. The yield of 2,4-diamino-7-methylpteridine is 11 parts (62%).

5 parts of 2,4-diamino-7-methylpteridine in 1,000 parts of 1 N sodium hydroxide solution is heated at 100° C. and a slow stream of oxygen bubbled through. After 4 hours the solution is acidified and the precipitate which forms is collected in the centrifuge. It is redissolved in very dilute sodium hydroxide solution at pH 11-12, treated with a little activated carbon and filtered. The filtrate is acidified with dilute hydrochloric acid, the product collected in the centrifuge, filtered, washed and dried. The yield of 2-amino-4-hydroxy-7-methylpteridine is 3.5 parts and the purity 95%. It is identified by comparison with a purified product prepared by a different method.

Example 4

In another experiment, using conditions identical with Example 3 with the exception that a stream of nitrogen instead of oxygen is bubbled through the reaction mixture, a yield of 3.9 parts of 2-amino-4-hydroxy-7-methylpteridine is obtained.

Example 5

A mixture of 26 parts of 2,4,5,6-tetraaminopyrimidine sulfate dihydrate and 260 parts of sodium sulfite in 900 parts of water is heated to 60° C. and then cooled to about 30° C. To this is added a solution of 22 parts of 30% methyl glyoxal and 5 parts sodium hydrogen sulfite in water to make 100 parts total volume. After 40 minutes the yellow precipitate is collected on the filter and washed with water. It is reslurried in 500 parts of water, and refiltered; this is repeated twice more, and the product when dried weighs about 12 parts. Additional purification is accomplished by treating 5 parts of the product above with 250 parts of 10% acetic acid. The insolubles are removed and the clear extract is treated with activated carbon and neutralized with ammonia to pH 6.4. The light yellow precipitate of 2,4-diamino-6-methylpteridine is collected and washed with water, then with acetone, and dried at 100° C./1-3 mm. for 2-3 hours.

Five parts of 2,4-diamino-6-methylpteridine prepared as above is heated at 100° C. in 250 parts of 1 N sodium hydroxide solution, under an atmosphere of nitrogen, for 5 to 6 hours. The solution is clarified to remove a small amount of sludge and acidified to pH 4. The yellow precipitate is collected and washed. It is redissolved in 17 parts of very dilute sodium hydroxide solution, and then the sodium hydroxide content is raised to 5 N. The precipitated sodium salt is collected, redissolved in water, clarified with activated carbon and neutralized with acetic acid. The dried product (4 parts) is identified as 2-amino-4-hydroxy-6-methylpteridine by comparison with a sample of known material.

Example 6

One part of 2,4-diamino-7-methylpteridine in about 50 parts of 5 N sodium hydroxide solution is heated at 100°-105° C. for a few minutes, until a clear solution is obtained. This is cooled and after several hours the sodium salt of 2-amino-4-hydroxy-7-methylpteridine crystallizes out. It is collected, dissolved in water, and acidified to give 2-amino-4-hydroxy-7-methylpteridine, identified by comparison with a sample of known material.

Example 7

A mixture of 5 parts of 2,4-diamino-7-methylpteridine, 2,000 parts of water, and 200 parts of barium hydroxide is heated on the steam bath three hours. The insolubles are removed by filtration and the clear solution is acidified to pH 3.5-4.0. The precipitate is collected in the centrifuge, washed, and dried. There is obtained 4.25 parts of 2-amino-4-hydroxy-7-methylpteridine.

Example 8

A mixture of 2 parts of 2,4-diamino-7-methylpteridine and 200 parts of ammonium hydroxide is heated on the steam bath in an open pessel until boiling ceases. Then 200 parts more of ammonium hydroxide is added and the heating is continued until boiling ceases. This process is repeated three times more, and a clear solution is obtained. This is decolorized with a little activated carbon and acidified to pH 3.5-4.0. A precipitate of 0.2 part of 2-amino-4-hydroxy-7-methylpteridine crystallizes out and is collected, washed, and dried.

Example 9

To 1,000 parts of 1 N benzyl-trimethylammonium hydroxide solution is added 20 parts of 2,4-diamino-7-methylpteridine, and the mixture is heated under refluxing conditions at 95°-105° C. for 4 to 5 hours. A small amount of activated carbon is added and the solution is filtered. The filtrate is acidified with hydrochloric acid and the precipitate is collected in the centrifuge, washed, and dried, to give 16.8 parts of 2-amino-4-hydroxy-7-methylpteridine.

Example 10

In an experiment similar to Example 9 using 1,000 parts of 1 N ammonium hydroxide solution instead of benzyl-trimethylammonium hydroxide, there is obtained 4 parts of 2-amino-4-hydroxy-7-methylpteridine.

Example 11

A mixture of 100 parts of 2,4-diamino-6-chloropyrimidine and 200 parts of dimethylamine in 800 parts of absolute ethanol is heated in a steel autoclave at 170° C. for three hours. On cooling, the resultant solution, a heavy crystalline precipitate forms, which is filtered off and dried. This weighs 102 parts and upon recrystallization from alcohol melts between 153°-173° C. This material is very soluble in water, contains halogen, and gives off dimethylamine when an excess of sodium hydroxide is added. Indications are that it is a double compound of 2,4-diamino-6-methylaminopyrimidine with dimethylamine hydrochloride. The substance is dissolved in water and a large excess of 50% sodium hydroxide added, resulting in the formation of a white precipitate, which is filtered off after cooling to 15° C. After two recrystallizations from ethanol, the 2,4-diamino-6-dimethylaminopyrimidine melts at 193°-194.5° C.

Ninety-five parts of 2,4-diamino-6-dimethylaminopyrimidine dimethylamino hydrochloride complex is converted to the free base as above. The wet cake is dissolved in 500 parts of water, and an equivalent amount of 5 N sulfuric acid added. The pH is then adjusted to 4. The mixture is heated to 80° C. and a 30% sodium nitrite solution added dropwise, until a permanent spot on starch-potassium iodide paper is reached. A shiny dark red precipitate forms which is filtered off after cooling to room temperature, washed with water, and air dried. The 2,4-diamino-5-nitroso-6-dimethylaminopyrimidine weighs 67.2 parts, representing a 91% yield of product melting with decomposition at 258°-259° C.

To a mixture of 67 parts of 2,4-diamino-5-nitroso-6-dimethylaminopyrimidine in 500 parts of water is added a solution of 5 N hydrochloric acid until all is dissolved. The solution is heated to 50° C., and 150 parts of sodium dithionite (sodium hydrosulfite) slowly added. The resultant yellow solution is acidified to pH 2 with 1 to 1 (by volume) sulfuric acid, and cooled to 5° C. for three hours, resulting in the formation of a heavy white precipitate. This is filtered off, washed with ice water, and dried at 45° C. The yield of 2,4,5-triamino-6-dimethylaminopyrimidine sulfate is 95.7 parts, or 98% of the theoretical. Purification is accomplished by reprecipitation from alkaline solution.

A mixture of 180 parts of 2,4,5-triamino-6-dimethylaminopyrimidine sulfate, 90 parts of p-aminobenzoylglutamic acid, and 3,000 parts of water is heated to 45° C. and adjusted to pH 3. To this is added dropwise and simultaneously, a solution of 33.7 parts of sodium dichromate in 400 parts of water and a solution of 146 parts of 2,3-dibromopropionaldehyde in 139 parts of glacial acetic acid. The pH is maintained at 3 with 5 N sodium hydroxide. The mixture is heated at 45° C. at pH 3 for twenty minutes longer, adjusted to pH 3.8, and cooled to 6° C. Approximately 180 parts of a golden brown product is obtained which by chemical assay contains 37 parts of 4-dimethylaminopteroylglutamic acid. Purification is accomplished by the following procedure. The crude product is added to 12,000 parts of water at 80° C. and 390 parts of 5 N sodium hydroxide added to effect solution. This is allowed to stir for ten minutes, and 45 parts of calcium chloride in 110 parts of water added. The mixture is filtered with the help of diatomaceous earth and the precipitate washed well with hot water. To the filtrate at 60° C. is added a solution of 10% zinc chloride to lower the alkalinity to pH 10.8. It is then filtered again with diatomaceous earth and the filtrate neutralized to pH 4 with hydrochloric acid, cooled to 3° C. for an hour, and then filtered with diatomaceous earth. The cake is then slurried in 6,700 parts of water at room temperature and 68 parts of lime added. The mixture is stirred at room temperature for ten minutes and then heated to 60° C., filtered and washed with hot water. To the filtrate at 60° C. is added 10% zinc chloride solution to pH 10.8, and the mixture then filtered with diatomaceous earth. The filtrate is heated to 80° C. and neutralized to pH 3.6, followed by filtration of the hot solution from some tarry material. It is then cooled to 6° C. and filtered after two hours with the aid of diatomaceous earth. The precipitate is slurried in 3,400 parts of water and warmed slowly to 60° C. while adding magnesium oxide slowly to a very faint spot on phenolphthalein paper. After ten minutes, 5 parts of activated charcoal is added. The mixture is stirred at 60° C. for fifteen minutes longer, and then filtered. The filtrate is neutralized to pH 3.8 at 80° C. and filtered hot. The filtrate is cooled to 60° C., filtered, and washed with water and acetone. After drying at 45° C. the yellow product weighs 9.2 parts and had a chemical assay of 69.6% as 4-dimethylaminopteroylglutamic acid. A portion of this material is given a second treatment with magnesium oxide-activated charcoal as above. It is then dissolved in dimethylformamide, in which it is quite soluble, treated with activated charcoal, and reprecipitated by the addition of an equal amount of ethanol. This procedure is repeated twice more, and the product then treated once more with magnesium oxide-activated charcoal as above. The product, 4-dimethylaminopteroylglutamic acid, is obtained as a bright yellow microcrystalline solid which melts with decomposition at 237°–239° C. (immersed at 180° C.).

To a solution of 200 parts of oxygen-free N sodium hydroxide solution is added 2 parts of 4-dimethylaminopteroylglutamic acid which is 69.6% by chemical assay and 0.87% by bioassay as a growth promoter for S. faecalis R. The solution is heated on the steam bath in an atmosphere of nitrogen for five hours, diluted to 1,000 parts, and added to 450 parts of 30% acetic acid solution at 80° C. The mixture is cooled, and the precipitate collected and dried, to give one part product. This product has a chemical assay of 69.9% calculated as pteroylglutamic acid and a bioassay of 75% as a growth promoter for S. faecalis R.

*Example 12*

A mixture of 12 parts of 2,4-diamino-6-chloropyrimidine and 15.5 parts of methylamine in 80 parts of absolute alcohol is heated in an autoclave at 120° C. for three hours. The resultant solution which is a dark yellow with a blue fluorescence, is filtered from a small amount of insoluble material and vacuum distilled to remove the ethanol. The residual oil is dissolved in 60 parts of warm water and filtered from a small dark precipitate. The mixture is cooled and 50% sodium hydroxide added until an oil separates. It is then extracted with isopropyl acetate. On cooling the ester extracts, a yellow solid crystallizes; dry weight, 3.4 parts. This is recrystallized twice from ethanol, and then melts at 192°–194° C.

Upon nitrosating 2,4-diamino - 6 - methylaminopyrimidine by the same procedure as described in Example 11, a shiny cherry-red product, 2,4-diamino-5-nitroso-6-methylaminopyrimidine, is obtained which after reprecipitation from acid solution melts with decomposition at 245°–247° C.

2,4 - diamino-5-nitroso-6-methylaminopyrimidine is reduced with sodium dithionite (sodium hydrosulfite) in a manner similar to that described in Example 11 above and 2,4,5-triamino-6-methylaminopyrimidine sulfate is obtained.

2,4,5 - triamino-6-methylaminopyrimidine sulfate is condensed with p-aminobenzoylglutamic acid and alpha-beta-dibromopropionaldehyde in the same fashion as the obve described reaction with the 6-dimethylamino derivative, except that barium chloride is added to the reaction mixture to convert the pyrimidine sulfate to the more soluble hydrochloride. From a reaction using 2.7 parts of 2,4,5-triamino-6-methylaminopyrimidine sulfate, 7.2 parts of crude product is obtained having a chemical assay of 10% as 4-methylaminopteroylglutamic acid.

The 4-methylaminopteroylglutamic acid, which has a slight antagonist activity, is treated with N sodium hydroxide at 100° C. under anaerobic conditions for five hours, and the product isolated by neutralization with acetic acid followed by cooling. The resultant product now shows a growth promoting activity for S. faecalis R. approximately equal to the chemical assay.

*Example 13*

Fifty parts of 2,4-diamino-6-chloropyrimidine, 92 parts p-aminobenzoylglutamic acid and 187 parts of dry ethylene glycol are heated together at 130° C. for three hours, cooled, and poured into several volumes of water. The resultant clear solution is rendered alkaline to benzoazurine test paper and warmed on the steam bath for fifteen minutes. Sodium hydroxide is added as needed to retain the alkalinity. The mixture is then clarified and added to a dilute acetic acid solution, causing the separation of a gummy precipitate which solidifies on washing with water. This is reprecipitated from alkaline medium, yielding a solid product, p-(2-4-diamino - 6 - pyrimidyl) - aminobenzoylglutamic acid, which is dried under reduced pressure, yielding a brittle solid which can be ground to a fine powder, weight 82.2 parts.

To a suspension of 71 parts of p-(2,4-diamino-6-pyrimidyl)aminobenzoylglutamic acid in 1,400 parts of water are added 77 parts of 5 hydrochloric acid and 70 parts of glacial acetic acid. The mixture is warmed until complete solution is obtained, and the pH adjusted to approximately 3 with sodium hydroxide. A concentrated sodium nitrite solution is then added dropwise to the above mixture at 80° C. until a permanent spot on starch-potassium iodide paper is reached. Just one mole of sodium nitrite is taken up. An orange-red precipitate is obtained, which is isolated and used as such in the next reaction.

The product of the above reaction is mixed with 1,400 parts of water and sodium hydroxide added until complete solution is obtained. The mixture is then heated to 45° C. and sodium dithionite (sodium hydrosulfite) added until the red color of the solution is gone. Approximately 135 parts is required. The product is then slowly added to dilute sulfuric acid, making sure to keep the mixture acid to Congo red at all times. A light yellow precipitate of p-(2,4,5-triamino-6-pyrimidyl)aminobenzoylglutamic acid sulfate is obtained which after isolation and drying weights 70 parts.

A mixture of 10 parts of p-(2,4,5-triamino-6-pyrimidyl)-aminobenzoylglutamic acid sulfate and 4.93 parts of barium chloride in 250 parts of water is heated on the steam bath for ten minutes and filtered from barium sulfate. Then 2.7 parts of p-aminobenzoylglutamic acid is added and the pH adjutsed to 2.5 with sodium hydroxide. To this mixture at 45° C. is then added dropwise a solution of 4.36 parts of 2,3-dibromopropionaldehyde in 4 parts of glacial acetic acid and 1.01 parts of sodium dichromate in 12 parts of water over a twenty minute period. The pH is maintained between 2.5 and 3 with sodium hydroxide. After thirty minutes longer at 45° C., the mixture is cooled and the precipitate filtered off, washed with water and acetone and dried. The p-[N,N'-(2-amino - 6 - methylpteridyl-4.9)-bisamino]benzoylglutamic acid weighed 9.6 parts.

To 300 parts of N sodium hydroxide solution which is oxygen-free is added 6 parts of the product prepared immediately above, with a chemical assay of 41.9% and a bioassay of 0.03% as a growth stimulant for S. faecalis R. The mixture is heated at 100° C. for five hours under nitrogen, diluted to 1,000 parts and added to 1,500 parts of 30% acetic acid solution at 80° C. On cooling, filtering and drying the precipitate, 1.66 parts of pteroylglutamic acid is obtained having a bioassay of 1.88% as a growth stimulant.

*Example 14*

Four hundred parts of 2,4-diamino-6-chloropyrimidine is mixed with 1,032 parts of piperidine and slowly heated over a one hour period to 100° C. on the steam bath. After an additional two and one-half hours at 100° C., 240 parts of ethanol is added to the hot mixture, which is then filtered from piperidine hydrochloride. The solvents are distilled from the filtrate under vacuum, whereupon the residue crystallizes. After extracting from water-soluble impurities, 330 parts of 2,4-diamino-6-(1-piperidyl)pyrimidine is obtained. Upon recrystallization from naphtha, silvery white shiny plates, melting at 135.5°–136.5° C., are obtained.

The nitrosation of 2,4-diamino-6-(1-piperidyl)-pyrimidine is carried out in the same fashion as that used in Example 11. A bright red nitroso derivative is formed, which melts with decomposition at 211.5°–213.0° C.

The reduction of 2,4-diamino-5-nitroso-6-(1-piperidyl)pyrimidine is carried out as previously described.

The condensation of 2,4,5-triamino - 6 - (1-piperidyl)-pyrimidine sulfate with p-aminobenzoylglutamic acid and alpha,beta-dibromopropionaldehyde is carried out in the same fashion as that described in Example 11. In a run using 230 parts of 2,4,5-triamino-6-(1-piperidyl)-pyrimidine sulfate, 260 parts of golden brown crude product is obtained, which gives a chemical assay indicating the presence of 44 parts of 4-(1-piperidyl)-pteroylglutamic acid. This is purified to a chemical assay of 73.4% by methods analogous to those described for the 4-dimethylamino derivative.

To a solution of 250 parts of oxygen-free N sodium hydroxide solution is added 6.8 parts of 4-(1-piperidyl)pteroylglutamic acid having a chemical assay of 73.4% and a bioassay of 1.5% as a growth promoter for S. faecalis R. The resultant solution is then heated on the steam bath for five hours in an atmosphere of nitrogen, diluted to 1,000 parts and added to 500 parts of 30% acetic acid solution at 85° C. The mixture is cooled slowly, resulting in the formation of a precipitate which is filtered off, washed with cold water and acetone and dried to give 3.98 parts. The product has a chemical assay of 63.5% calculated as pteroylglutamic acid, and a bioassay of 56.5% as a growth promoter for S. faecalis R.

I claim:

1. A method which comprises heating a compound having the formula:

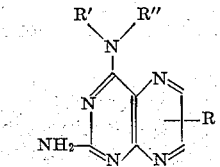

in which R is a member of the group consisting of alkyl and amino-substituted alkyl radicals and R' and R'' are members of the group consisting of hydrogen, lower alkyl, and phenyl radicals and radicals forming a portion of a piperidine ring in a substantially aqueous solvent under alkaline conditions in the absence of oxidizing agents and thereafter recovering a compound having the formula:

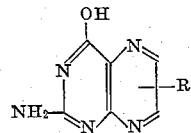

in which R is as defined above.

2. A method which comprises heating a compound having the formula:

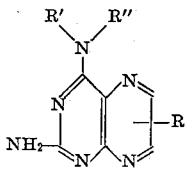

in which R is a member of the group consisting of alkyl and amino-substituted alkyl radicals and R' and R'' are members of the group consisting of hydrogen, lower alkyl, and phenyl radicals and radicals forming a portion of a piperidine ring in a substantially aqueous solvent under alkaline conditions at a temperature of from about 80° to 110° C. for from about 2 hours to about 8 hours, in the absence of oxidizing agents, and thereafter recovering a compound having the formula:

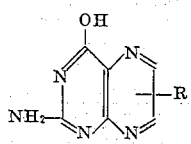

in which R is as defined above.

3. A method which comprises heating a 2-amino-4-di-lower alkylamino-6-amino substituted alkyl pteridine in an aqueous alkaline solution in the absence of oxidizing agents and recovering therefrom a 2-amino-4-hydroxy-6-amino substituted alkyl pteridine.

4. A method which comprises heating an N[4-{[(2-amino-4-di-lower alkylaminopyrimido[4,5 - b]pyrazyl - 6) methyl]amino}benzoyl]glutamic acid in an aqueous alkaline solution in the absence of oxidizing agents and recovering therefrom N[4-{[(2-amino-4-hydroxypryrimido[4,5-b]pyrazyl - 6) methyl ] amino } benzoyl ] glutamic acid.

5. A method which comprises heating N[4-{[(2-amino - 4 - dimethylaminopyrimido[4,5-b]-pyrazyl-6)-methyl]amino}benzoyl]glutamic acid in an aqueous alkaline solution in the absence of oxidizing agents and recovering therefrom N[4-{[(2-amino -4 - hydroxypyrimido[4,5-b]pyrazyl-6)methyl]amino}benzoyl]glutamic acid.

6. A method which comprises heating N[4-{[(2 - amino - 4 - (1 - piperidyl) pyrimido[4,5-b]-pyrazyl-6)methyl]amino}benzoyl]glutamic acid in an aqueous alkaline solution in the absence of oxidizing agents and recovering therefrom N[4-{[(2 - amino - 4 - hydroxypyrimido[4,5 - b]-pyrazyl-6)methyl]amino}benzoyl]glutamic acid.

7. A method which comprises heating a 2-amino-4-(1-piperidyl)-6-amino-substituted alkyl pteridine in an aqueous alkaline solution in the absence of oxidizing agents and recovering therefrom a 2-amino-4-hydroxy-6-amino-substituted alkyl pteridine.

8. A method of preparing compounds having the general formula:

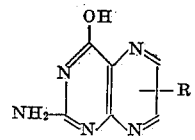

in which R is a member of the group consisting of alkyl and amino-substituted alkyl radicals, which comprises heating a compound having the formula:

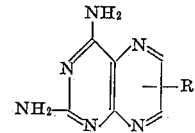

in which R is as defined above, in a substantially aqueous solvent under alkaline conditions in the absence of oxidizing agents and thereafter recovering the said product.

9. A method of preparing compounds having the general formula:

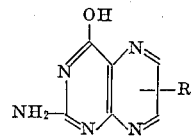

in which R is a member of the group consisting of alkyl and amino-substituted alkyl radicals, which comprises heating a compound having the formula:

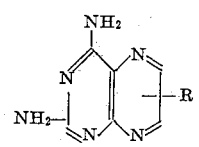

in which R is as defined above, in a substantially aqueous solvent under alkaline conditions to a temperature of from about 80° to 110° C. for from about 2 hours to about 8 hours, in the absence of oxidizing agents and thereafter recovering the said product.

10. A method of preparing N-[4-{[(2-amino-4-hydroxypyrimido [ 4,5 - b ] pyrazyl - 6 ) methyl]amino}benzoyl]glutamic acid which comprises heating N-[4-{[(2,4 - diaminopyrimido[4,5 - b]-pyrazyl-6)methyl]amino}benzoyl]glutamic acid in an aqueous alkaline solution in the absence of oxidizing agents and thereafter recovering the said N-[4-{[(2 - amino-4-hydroxypyrimido[4,5-b]pyrazyl - 6) methyl]amino }benzoyl]glutamic acid.

JAMES M. SMITH, JR.

No references cited.